United States Patent [19]
Fuchs et al.

[11] 3,998,204
[45] Dec. 21, 1976

[54] FLOATABLE BALL

[76] Inventors: Francis J. Fuchs; Dorothy J. Fuchs, both of 9 University Way, Princeton, N.J. 08540

[22] Filed: May 13, 1975

[21] Appl. No.: 577,100

[52] U.S. Cl. .............................. 126/270; 4/172.12; 220/218; 126/271
[51] Int. Cl.² ............................................ F24J 3/02
[58] Field of Search .......... 126/270, 271; 4/172.12; 220/216, 218

[56] References Cited
UNITED STATES PATENTS

| | | | |
|---|---|---|---|
| 3,072,920 | 1/1963 | Yellott | 4/172.12 |
| 3,125,091 | 3/1964 | Sleeper, Jr. | 126/271 |
| 3,687,329 | 8/1972 | Baum | 220/216 |
| 3,893,443 | 7/1975 | Smith | 4/172.12 |

FOREIGN PATENTS OR APPLICATIONS

| | | | |
|---|---|---|---|
| 13,780 | 12/1928 | Australia | 4/172.12 |
| 840,214 | 1/1939 | France | 220/216 |

*Primary Examiner*—Kenneth W. Sprague
*Attorney, Agent, or Firm*—Carella, Bain, Gilfillan & Rhodes

[57] ABSTRACT

A floatable ball, a plurality of which floatable balls are for providing a gapless floating ball blanket, wherein the floatable ball includes a modified spheroid constructed of a floatable material and which modified spheroid is provided with a plurality of flat surfaces around the equator which flat surfaces provide the modified spheroid with an equatorial cross-section the outline of which is a closed plane figure comprised of interconnected straight lines equal in number to the plurality of flat surfaces, and a plurality of which floatable balls are engageable in flat surface-to-surface contact at the flat surfaces around the equators thereof to provide the gapless floating ball blanket. The floatable ball may further include means for absorbing and transferring radiant energy whereby the floatable ball can be utilized to heat liquid covered thereby.

11 Claims, 13 Drawing Figures

FIG. 1
"LEFT" PRIOR ART SPHERIODS
"RIGHT" HEXA-SPHERIODS
FIG. 2
TYPICAL PRIOR ART HOLLOW SPHERIOD
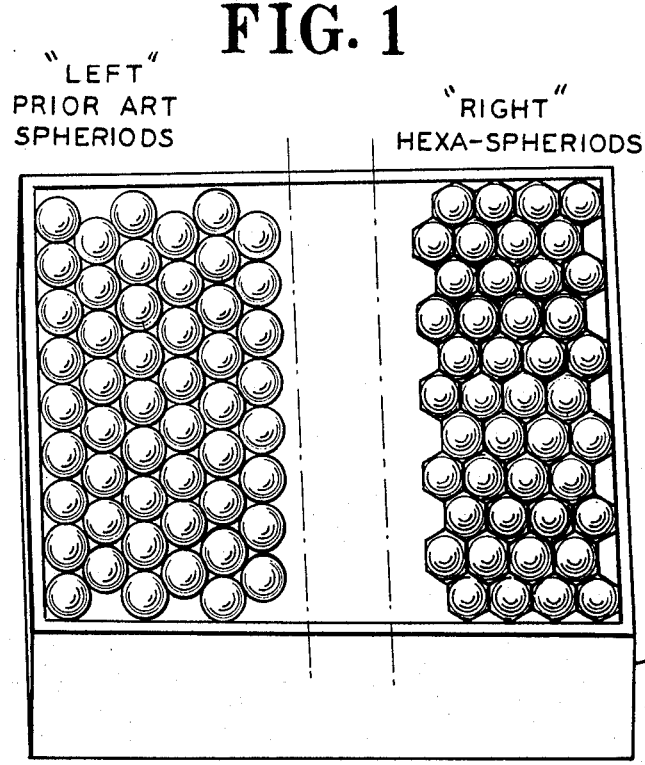
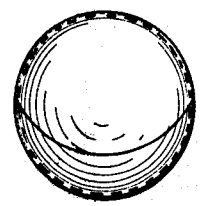
FIG. 3A
HEXA-SPHERIOD (PREFERED)
FIG. 3B
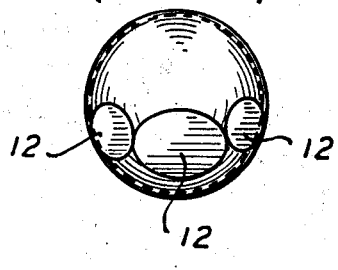
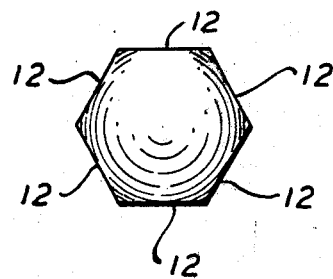
FIG. 4A
CUBI-SPHERIOD
FIG. 4B
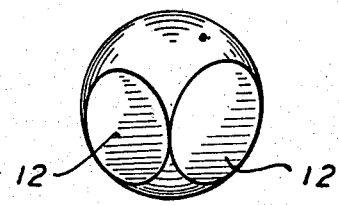
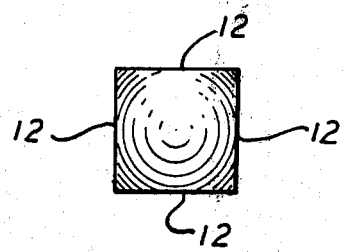

TRIA-SPHERIOD

HEXA-OBLATE SPHEROID

OPAQUE HEXA-SPHERIOD THICK BOTTOM

HEXA-SPHERIOD RADIATION ABSORBING AND TRANSFERRING

HEXA-SPHERIOD WITH LENS. CONFINED BACK RADIATION

FLOATABLE BALL

BACKGROUND OF THE INVENTION

The present invention relates generally to a new and improved floatable ball a plurality of which provide a gapless floating ball blanket.

As is known to those skilled in the floating ball blanket art, the floating ball blankets of the prior art are typically comprised of a plurality of spherical, hollow plastic balls used to cover liquid surfaces such as the liquid surface of a typical controlled temperature bath. Such typical controlled temperature bath may include acid pickling, plating, rinsing, dyeing, anodizing, phosphating and food processing tanks containing liquids, or semi-liquids, generally maintained at elevated temperatures.

Such floating ball blankets comprised of the generally hollow spherical floatable balls of the prior art are reputed to help control the temperature by limiting the surface area exposed to air thereby limiting liquid loss by evaporation, heat loss by such evaporation, and heat transfer (either loss or gain) by convection from the surface of the covered liquid.

As is further known to those skilled in the floating blanket art, the spherical floatable balls of the prior art, due to their spherical configuration are engageable only in point-to-point contact, and hence provide a floating ball blanket having a plurality of gaps, between the spherical floatable balls which gaps leave open space for liquid loss by evaporation, heat loss by such evaporation, and heat transfer by convection from the surface of the liquid. Such floatable balls of spherical configuration can cover only approximately 91% of the surface of the liquid and in actual practice, it has been found that such spherical floatable balls known to the prior art float high enough in the liquid that much less than 91% of the liquid surface is in contact with the ball and thus surface evaporation and heat transfer by convection are not curtailed sufficiently as is desired.

Furthermore, the spherical shape of the typical prior art floatable ball allows it to roll freely as the liquid is agitated and this rolling action produces an effect similar to the ballpoint pen action: namely, the liquid which wets the bottom of the ball surface is rolled upwardly and exposed to the air and readily evaporates.

SUMMARY OF THE INVENTION

The present invention overcomes the above-noted prior art problems and also presents opportunities for much greater application for floating ball blankets comprised of the new and improved floatable balls of the present invention.

Unlike the spherically shaped floatable ball known to the prior art, the floatable ball of the present invention is a modified spheroid provided with a predetermined number of flat surfaces around its equator whereby a plurality of such modified spheroids are engageable in flat surface-to-surface engagement at the equators thereof to provide a gapless or uninterrupted floating ball blanket. The gapless or uninterrupted floating ball blanket substantially prevents liquid loss by evaporation, heat loss by such evaporation, and heat transfer (either loss or gain) by convection from the surface of the liquid.

Further, the floatable ball of the present invention may further include means for orienting the floatable ball upon being floated such that the flat surfaces provided at the equator thereof are disposed horizontally and are presented for flat surface-to-surface engagement with the flat surfaces of other floatable balls of the present invention similarly configured and similarly oriented.

Still further, the floatable ball of the present invention may be constructed as set forth in detail below so as to absorb radiant energy and transfer the absorbed radiant energy to the liquid covered by the floatable ball blanket.

DESCRIPTION OF THE DRAWINGS

FIG. 1 is a diagrammatic view, in perspective, of a controlled temperature bath, the left portion of the liquid surface of the bath being covered with a floating ball blanket comprised of the spherical floatable balls known to the prior art and the rightward portion of the surface being covered with a floating ball blanket comprised of a plurality of one embodiment of the floatable ball of the present invention;

FIG. 2 shows the lower half of a typical prior art floatable ball which is a hollow spheroid;

FIGS. 3A, 3B FIGS. 4A and 4B, FIGS. 5A and 5B, and FIGS. 6A and 6B show perspective side and top views of floatable ball embodiments of the present invention;

DESCRIPTION OF THE INVENTION

Referring now to FIG. 1 of the drawings, there is shown a typical temperature controlled bath 10 with the leftward surface 12 thereof being covered with a floating ball blanket comprised 5 of a plurality of spherical floatable balls known to the prior art, and the rightward portions of the surface being covered with a floating ball blanket comprised of a plurality of floatable balls of the present invention. It will be noted that the prior art floating blanket of spherical floatable balls includes a plurality of gaps between the balls which do not come into flat surface-to-surface contact but instead, due to their spherical configuration, come into point-to-point engagement. To the contrary, the floating ball blanket comprised of a plurality of floatable balls of the present invention which are provided with a plurality of flat surfaces around the equators thereof, provides a floating ball blanket which is gapless and thereby eliminates the liquid loss, heat loss and heat transfer by convection from the surface of the liquid caused by the gaps in the prior art floating ball blanket.

The typical prior art floatable ball is shown in greater detail in FIG. 2 wherein the lower half or semi-spherical portion of the prior art floatable ball is shown. As may be noted from FIG. 2, the prior art floatable ball is hollow and of thin-wall construction and of true spherical configuration.

Figure 5A:
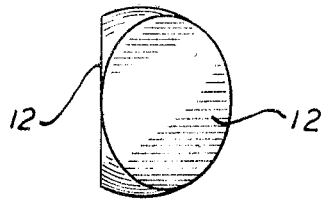
Figure 5B:
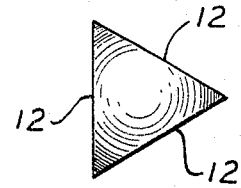
Figure 6A:
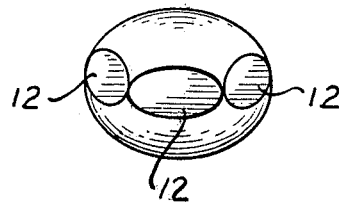
Figure 6B:
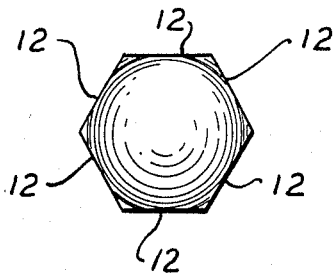

Referring now to FIGS. 3A and 3B ... FIGS. 6A and 6B, there are shown floatable balls of the present invention which are provided with a predetermined number of flat surfaces 12 around the equator thereof. As may be noted from B FIGS. of each FIGURE, which provide top views, the flat surfaces provided around the equator provide, the modified spheroid with an equatorial cross-section the outline of which is a closed plane figure comprised of a plurality of interconnected straight lines equal in number to the respective number of flat surfaces. More specifically, it will be noted that the embodiment of the floatable ball of the present invention shown in FIGS. 3A and 3B is a modified spheroid provided with six flat surfaces 12 around its equator. FIGS. 4A and 4B show another embodiment of the floatable ball of the present invention which is a modified spheroid provided with four flat surfaces 12 around its equator. Similarly, FIGS. 5A and 5B show a further embodiment of the floatable ball of the present invention which is a modified spheroid provided with three flat surfaces 12 around its equator, and, FIGS. 6A and 6B show a still further embodiment of the floatable ball of the present invention wherein the modified spheroid is an oblate spheroid.

Accordingly, upon a floating ball blanket being comprised of a plurality of floatable balls of the present invention, such as the embodiment shown in FIGS. 3A and 3B, and as illustrated in the rightward portion of FIG. 1, the floatable balls upon floating upon the surface of a liquid are engageable in flat surface-to-surface contact or engagement with the respective flat surfaces 12 in engagement, thereby providing a gapless or uninterrupted floating ball blanket. Similarly, a floating ball blanket comprised of a plurality of either the floatable ball embodiments of the present invention shown in FIGS. 4A and 4B or FIGS. 5A and 5B or FIGS. 6A and 6B would similarly provide a floating ball blanket wherein the floatable balls upon being floated come into flat surface-to-surface engagement thereby providing a gapless or uninterrupted floating ball blanket.

Further, it has been found that upon the floatable balls of the present invention being floated that surface tension and slight agitation of the liquid tend to pull the floatable balls together thereby assisting in their formation of a gapless or uninterrupted cover for the surface thereby preventing the above-noted prior art problems attendant to the floating ball blankets comprised of the spherical floatable balls known to the prior art.

Figure 7:
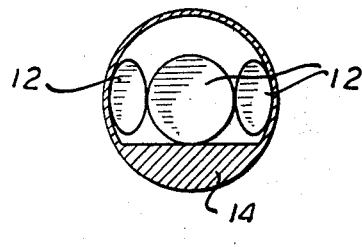
FIG. 7 is a side view, in cross section, illustrating an embodiment of the floatable ball of the present invention provided with means for orienting the floatable ball in a predetermined manner upon being floated.

Referring now to FIG. 7, there is shown a further embodiment of the floatable ball of the present invention wherein the floatable ball is provided with means for orienting the ball when floating such that the flat surfaces 12 are disposed horizontally and are presented for flat surface-to-surface engagement with the flat surfaces of other similarly configured and oriented floatable balls. More specifically, the floatable ball of the present invention may be substantially hollow and comprised of a generally thin, plastic wall and wherein the means 14 for orienting the floating ball comprises a bottom wall portion which is thicker and hence heavier than the top and side wall portions and which will cause the ball to rotate and orient itself upon the liquid being slightly agitated such that the heavier portion assumes the bottom orientation thereby assuring that the flat surfaces 12 are disposed or oriented horizontally for flat surface-to-surface engagement with the flat surfaces of other similarly configured and oriented floatable balls. Further, it will be understood that upon the floatable ball of the present invention being provided with such orienting means 14 shown in FIG. 7 no rolling or ballpoint pen action can occur and hence the above-noted liquid loss due to evaporation attendant to the spherical floatable ball known ball of the present invention is shown in FIG. 8 wherein the top half of the modified spheroid may be made of clear plastic and the bottom half may be made of metal-filled black plastic or, as shown, metal the top surface of which is provided with a black coating for absorbing radiant energy.

Figure 9:
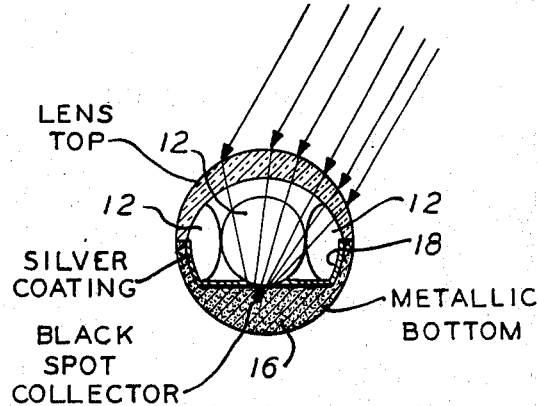

Referring now to FIG. 9 of the present invention, a further embodiment of the floatable ball of the present invention is shown for absorbing and transferring radiant energy wherein the top upper wall portion of the modified spheroid is shaped, as shown, to provide a generally semi-spherical convex lens for focusing radiant energy on the radiant energy absorbing and thermally conductive materials 16. The bottom half or portions of the modified spheroid is comprised of metal and is provided with a top inner surface which is substantially flat and circular and which top inner surface also includes an integrally formed annular side wall portion which side wall portion extends upwardly and outwardly to a predetermined height as shown. Further, and in accordance with the teaching of the present invention, the top inner surface of the metal 16 may be covered with a black coating for absorbing radiant energy and may further include a silver coating having a generally centrally formed aperture as shown for confining the surface exposure of the black coating and for lessening any tendency of the metal 16 to re-radiate the radiant energy absorbed upwardly. The centrally formed aperture of the silver coating covering the black coating provides a black spot radiant energy collector.

Figure 8:
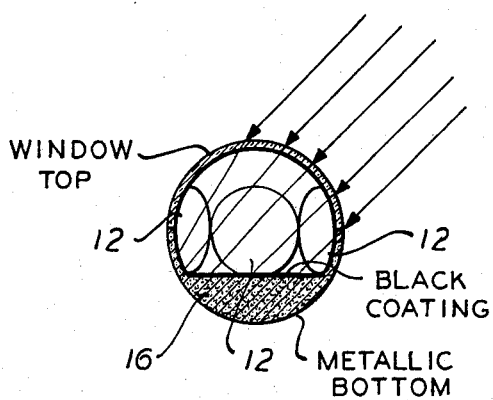
FIGS. 8 and 9 are side views, in cross section, of other embodiments of the floatable ball of the present invention for absorbing and transferring radiant energy.

The floatable balls of the present invention illustrated in FIGS. 8 and 9 for absorbing and transferring radiant energy may be used to transfer heat to the liquid covered by a floating ball ball of the present invention is shown in FIG. 8 wherein the top half of the modified spheroid may be made of clear plastic and the bottom half may be made of metal-filled black plastic or, as shown, metal 16 the top surface of which is provided with a black coating for absorbing radiant energy.

Referring now to FIG. 9 of the present invention, a further embodiment of the floatable ball of the present invention is shown for absorbing and transferring radiant energy wherein the top upper wall portion of the modified spheroid is shaped, as shown, to provide a generally semi-spherical convex lens for focusing radiant energy on the radiant energy absorbing and thermally conductive material 16. The bottom half or portion of the modified spheroid is comprised of radiant energy absorbing and transferring material such as metal which may be provided with a top inner surface which is substantially flat and circular and which top inner surface also includes an integrally formed annular side wall portion 18 which side wall portion extends upwardly and outwardly to a predetermined height as shown. Further, and in accordance with the teaching of the present invention, the top inner surface of the metal may be covered with a black coating for absorbing radiant energy and may further include a silver coating having a generally centrally formed aperture as shown for confining the surface exposure of the black coating and for lessening any tendency of the metal to re-radiate the radiant energy absorbed upwardly. The centrally formed aperture of the silver coating covering the black coating provides a black spot radiant energy collector.

The floatable balls of the present invention illustrated in FIGS. 8 and 9 for absorbing and transferring radiant energy may be used to transfer heat to the liquid covered by a floating ball blanket comprised of such floatable balls whereby the radiant energy absorbed by such floatable balls would be transferred to the liquid covered by the floating ball blanket by the radiant energy absorbing bottom portion 16. Further, upon the floatable balls being substantially hollow as shown in FIGS. 8 and 9, the inner air space and top portion serve to insulate and protect the liquid covered by the floatable balls and prevent the liquid from losing heat by conduction through the balls to the air.

One attractive and beneficial use of such floatable balls is to heat swimming pools. The floatable balls can be drained off into a storage tank when the pool is in use and can be poured or delivered back onto the surface of the pool by a suitable valve arrangement attached to the filtering system typically associated with the swimming pool. Clearing the swimming pool and recovering the floatable balls in this manner would take only a few minutes and would provide no undesirable interruption of pool use. Further, all white balls according to the present invention could be substituted for the composite floatable balls shown in FIGS. 8 and 9 at night with a similar ball handling system and such white floatable balls would prevent heat loss to the cold night sky by radiation. In addition to the swimming pool example, any solar energy (or other radiant energy source such as an infrared lamp) collection system or application would benefit similarly from such floatable balls of the present invention for absorbing and transmitting radiant energy. For example, shallow surface pools could be made at very low cost by leveling the ground, covering with plastic, filling with water and covering the water with a floating ball blanket comprised of the floatable balls of the present invention illustrated in FIGS. 8 and 9. The heated water from such shallow surface pools could be utilized in many applications, such as the heating of homes. Similarly, controlled temperature baths using infrared lamps as a radiant energy heating source could be used instead of the built-in immersion heaters typically used in such controlled temperature baths.

In further regard to the floatable balls for absorbing and transferring radiant energy illustrated in FIGS. 8 and 9, investigation reveals that during a normal day of sunlight in the New York City area, approximately 2,100 B.T.U.'s of solar radiation can be collected in water per square foot of pool surface. This makes it possible to utilize a 35 foot square pool to generate as much heat as a 100,000 B.T.U./hr. furnace utilizing a floating ball blanket comprised of floatable balls as illustrated in FIGS. 8 and 9. Thus, it will be understood that the present invention makes a significant impact on and contribution to the present energy shortage.

It will be understood by those skilled in the art that the floatable balls of the present invention illustrated in FIGS. 3A and 3B . . . 6A and 6B may be either hollow or substantially hollow as shown or, depending upon various technical considerations, such as manufacturing, heat of the liquid to be covered, the balls may be solid and that the ultimate consideration is that the floatable balls be made of a predetermined floatable material such that the balls will float on the liquid to be covered by the floating ball blanket comprised of the balls. In addition, it has been found that the preferred floatable ball is made of a predetermined material such that its density causes the floatable ball to float such that its equator is coincident, or substantially coincident, with the top surface of the liquid to be covered.

Further in accordance with the teaching of the present invention, it will be understood that the hollow, or substantially hollow floatable balls of the present invention, in particular the embodiments of FIGS. 3A and 3B . . . 6A and 6B may be filled with a low density gas such as helium or may be evacuated to further curtail heat loss. Further, it has been found that at night droplets of water or condensate will form on the inner surface of the top portion of the floatable balls which will further curtail heat loss and in daylight such vapor or condensation will evaporate and return to the gas state.

It will be understood by those skilled in the art that many modifications and variations of the present invention may be made without departing from the spirit and the scope thereof.

What is claimed is:
1. A floatable ball, a plurality of which floatable balls are for providing a gapless floating ball blanket, comprising:
a modified spheroid made of predetermined floatable material;
the modified spheroid is provided with a predetermined number of flat surfaces around the equator thereof, the flat surfaces provide the modified spheroid with an equatorial cross-section the outline of which is a closed plain figure comprised of interconnected straight lines equal in number to said predetermined number and wherein a vertical cross-section taken across the modified spheroid at diametrically opposed junctures of adjacent flat surfaces is a circle; and
whereby a plurality of said floatable balls are engageable in flat surface-to-surface contact at said flat surfaces around the equators thereof to provide a gapless floating ball blanket.

2. A floatable ball according to claim 1 wherein said modified spheroid is an oblate spheroid.

3. A floatable ball according to claim 1 wherein said modified spheroid is provided with four flat surfaces around the equator thereof.

4. A floatable ball according to claim 1 wherein said modified spheroid is provided with six flat surfaces around the equator thereof.

5. A floatable ball according to claim 1 wherein said floatable ball is provided with means for orienting the ball when floating such that said flat surfaces are disposed horizontally and are presented for flat surface-to-surface engagement with the flat surfaces of other similarly configured and oriented floatable balls.

6. A floatable ball according to claim 5 wherein said floatable ball is substantially hollow and comprised of a generally thin wall and wherein said means for orienting said ball comprises a bottom wall portion which is heavier than the top and side wall portions of said floatable ball.

7. A floatable ball according to claim 6 wherein the top wall portion of said modified spheroid is comprised of material transparent to radiant energy and wherein the bottom wall portion of said modified spheroid is comprised of radiant energy absorbing and thermally conductive material.

8. A floatable ball according to claim 7 wherein said radiant energy absorbing and thermally conductive material is metal-filled black plastic material.

9. A floatable ball according to claim 7 wherein said radiant energy absorbing and thermally conductive material is metal the top surface of which is provided with a black coating.

10. A floatable ball according to claim 7 wherein said radiant energy absorbing and thermally conductive material is black plastic.

11. A floatable ball according to claim 7 wherein said top wall portion of said modified spheroid transparent to radiant energy is shaped to provide a generally semi-spherical convex lens for focusing said radiant energy on said radiant energy absorbing and thermally conductive material; wherein said bottom portion of said modified spheroid comprised of said radiant energy absorbing and thermally conductive material is metal and which metal is provided with a top inner surface which is substantially flat and circular and which top inner surface also includes an integrally formed annular side wall portion which side wall portion extends upwardly and outwardly and is of a predetermined height; and wherein said floatable ball further includes: (i) a black coating covering said top inner surface of said metal, and (ii) a silver coating having a generally centrally formed aperture covering said black coating and for absorbing and transferring said radiant energy to said black coating, said silver coating provided with said generally centrally formed aperture for confining the surface exposure of said black coating and for lessening any tendency of said metal portion to reradiate said radiant energy upwardly.

* * * * *

UNITED STATES PATENT OFFICE
CERTIFICATE OF CORRECTION

Patent No. 3,998,204     Dated December 21, 1976

Inventor(s) Francis J. Fuchs and Dorothy J. Fuchs

It is certified that error appears in the above-identified patent and that said Letters Patent are hereby corrected as shown below:

Column 2, line 41 delete "5".

Column 2, line 68 after "from" insert --the--.

Signed and Sealed this

Seventh Day of June 1977

[SEAL]

Attest:

RUTH C. MASON
*Attesting Officer*

C. MARSHALL DANN
*Commissioner of Patents and Trademarks*